(12) United States Patent
Wang

(10) Patent No.: US 7,533,591 B2
(45) Date of Patent: May 19, 2009

(54) FAST-RELEASING CONTROLLING DEVICE OF ACTUATOR FOR ELECTRIC SICKBED

(75) Inventor: Chia-Jung Wang, Xindian (TW)

(73) Assignee: T-Motion Technology Co., Ltd., Taipei (TW)

( * ) Notice: Subject to any disclaimer, the term of this patent is extended or adjusted under 35 U.S.C. 154(b) by 219 days.

(21) Appl. No.: 11/681,765

(22) Filed: Mar. 3, 2007

(65) Prior Publication Data

US 2008/0210029 A1    Sep. 4, 2008

(51) Int. Cl.
*F16H 27/02*    (2006.01)
(52) U.S. Cl. ............................ 74/89.39; 74/89.37; 5/616
(58) Field of Classification Search ................. 74/425, 74/89.37, 89.38, 89.39; 5/616, 424, 618
See application file for complete search history.

(56) References Cited

U.S. PATENT DOCUMENTS

| 7,066,041 B2 * | 6/2006 | Nielsen ................. 74/89.35 |
| 2004/0093969 A1 * | 5/2004 | Nielsen ................. 74/89.23 |
| 2005/0160846 A1 * | 7/2005 | Chiang ................. 74/89.35 |
| 2005/0283914 A1 * | 12/2005 | Roussy ................. 5/616 |
| 2007/0169578 A1 * | 7/2007 | Christensen et al. ....... 74/89.37 |

FOREIGN PATENT DOCUMENTS

TW    M275836    9/2005

* cited by examiner

*Primary Examiner*—David M Fenstermacher

(57) ABSTRACT

A fast-releasing controlling device of an actuator includes a clutching means, a turning means and a pulling means. The clutching means is accommodated within a base of the actuator, and includes a fixing base and a clutch. The turning means is accommodated within the casing of the actuator and includes a swinging arm pivoted to the base. One end of the swinging arm is arranged to correspond to the clutch so as to control clutching action of the clutch relative to the fixing base. The pulling means includes a pulling rod assembly. One end of the pulling rod assembly is accommodated within the casing and connected to the swinging arm, and the other end thereof penetrates out of the casing and is joined with a connecting block.

16 Claims, 7 Drawing Sheets

FAST-RELEASING CONTROLLING DEVICE OF ACTUATOR FOR ELECTRIC SICKBED

BACKGROUND OF THE INVENTION

1. Field of the Invention

The present invention relates to a fast-releasing controlling device, and in particular to a fast-releasing controlling device of an actuator suitable for an electric sickbed.

2. Description of Prior Art

It is well known that actuators can be widely used in electric sickbeds, treadmills, and wheelchairs for adjusting or changing the positions or inclination thereof. When a patient is subjected to an emergent medical treatment, a fast-releasing controlling device capable of generating a fast-releasing action on the actuator can rapidly change and adjust the position of the sickbed, thereby to strive for the most important time for rescuing the patient. Therefore, it is an important issue for those skilled in this art to develop such fast-releasing controlling device of an actuator.

Taiwan Patent Publication No. M275836 discloses a conventional fast-releasing controlling device of an actuator. The actuator comprises a motor means and a transmission means. The motor means comprises a motor and a worm projecting outwardly from the center of the motor. The transmission means comprises a screw rod, a worm gear connected to one end of the screw rod and engaged with the worm, and a base covering one end of the screw rod and the worm gear. The fast-releasing controlling device utilizes a turning arm and a cable connected to one end of the turning arm to control the clutching action between the worm gear and the worm, thereby to achieve the fast-releasing action of the actuator However, when in use, there are still some drawbacks existing in the conventional fast-releasing controlling device of an actuator. Since the turning arm presses onto the base with a fulcrum to swing in a curved manner, the direction of the applied forces of the turning arm and the cable change continuously. As a result, the applied force should be larger, causing the operation less smoothly. Further, the base is provided with holes for allowing the insertion of the turning arm. Thus, moist or dust often penetrates into the base, causing the corrosion of the internal components and in turn the substantial reduction in lifetime. Therefore, there is still much room for improvement.

SUMMARY OF THE INVENTION

The present invention is to provide a fast-releasing controlling device of an actuator, in which a pulling rod assembly is connected to a swinging arm to transfer the curved swinging movement into a linear displacement, thereby to substantially reduce the tension force applied to the cable by an operator.

In order to achieve the above objects, the present invention provides a fast-releasing controlling device of an actuator. The actuator has a motor means and a transmission means. The motor means comprises a casing. The transmission means comprises a screw rod and a base covering on one end of the screw rod. The fast-releasing controlling device includes a clutching means, a turning means and a pulling means. The clutching means covers on the screw rod and is accommodated within the base, which comprises a fixing base and a clutch arranged to correspond to the fixing base. The turning means is accommodated within the casing and comprises a swinging arm pivoted to the base. One end of the swinging arm is arranged to correspond to the clutch so as to control clutching action of the clutch relative to the fixing base. The pulling means comprises a pulling rod assembly. One end of the pulling rod assembly is accommodated within the casing and connected onto the swinging arm, and the other end thereof penetrates out of the casing and is joined with a connecting block.

According to another aspect, the present invention is to provide a fast-releasing controlling device of an actuator, in which the pulling means is first fixedly connected within an upper casing, and then the upper casing covers on a lower casing, thereby to substantially simplify the process of assembling the actuator and reduce the time for assembling.

According to another aspect, the present invention is to provide a fast-releasing controlling device of an actuator. With the integrally sealed manufacture of the upper and lower casings, waterproof gaskets are provided between the upper casing and the pulling rod, thereby to generate a better dust-proof, waterproof and moisture-proof effect within the casing.

DETAILED DESCRIPTION OF THE INVENTION

The detailed description and the technical contents of the present invention will be explained with reference to the accompanying drawings. However, it should be understood that the drawings are illustrative only but not to limit the present invention thereto.

Figure 1:
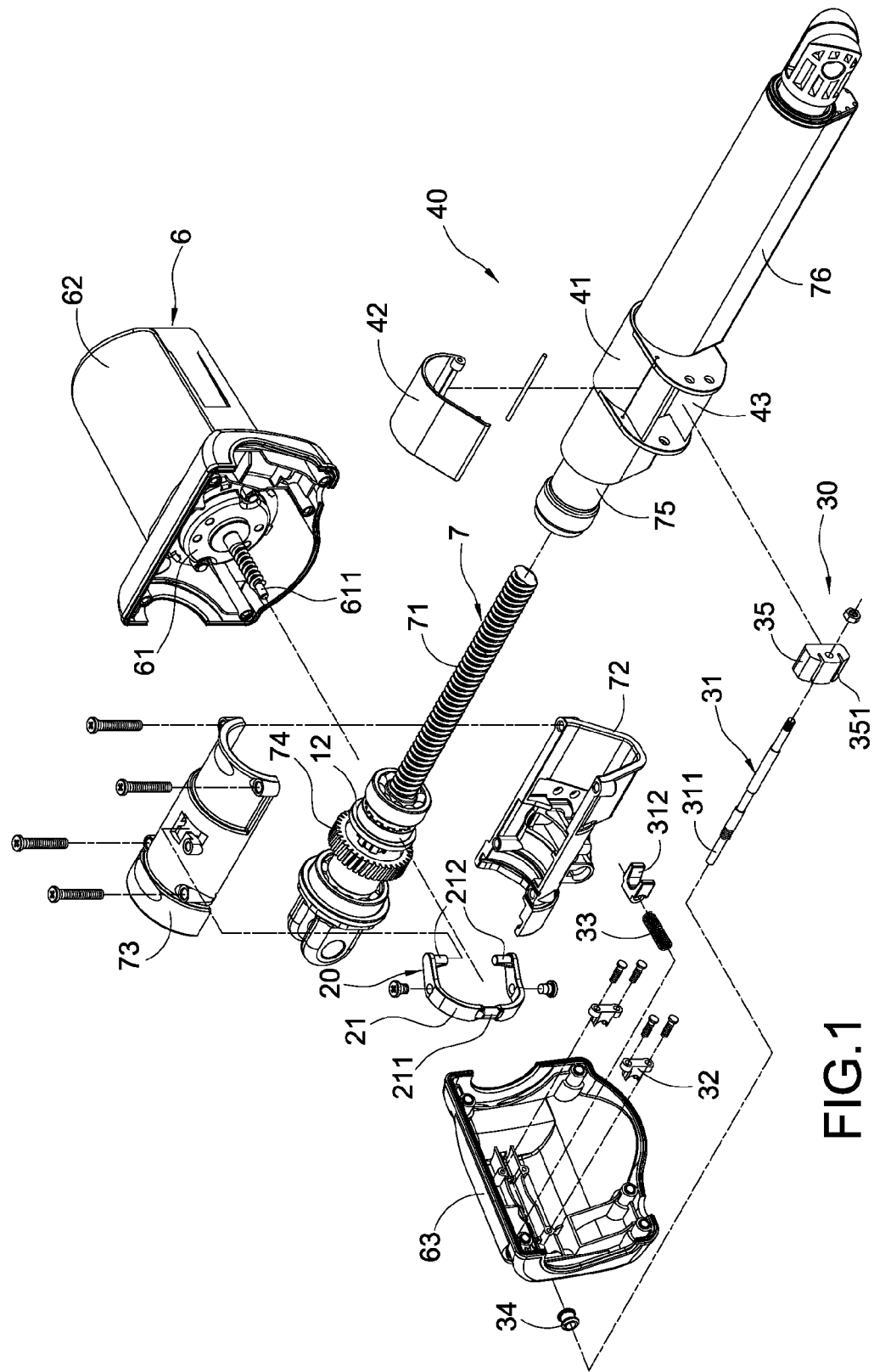
FIG. 1 is an exploded perspective view of the actuator of the present invention.
Figure 2:
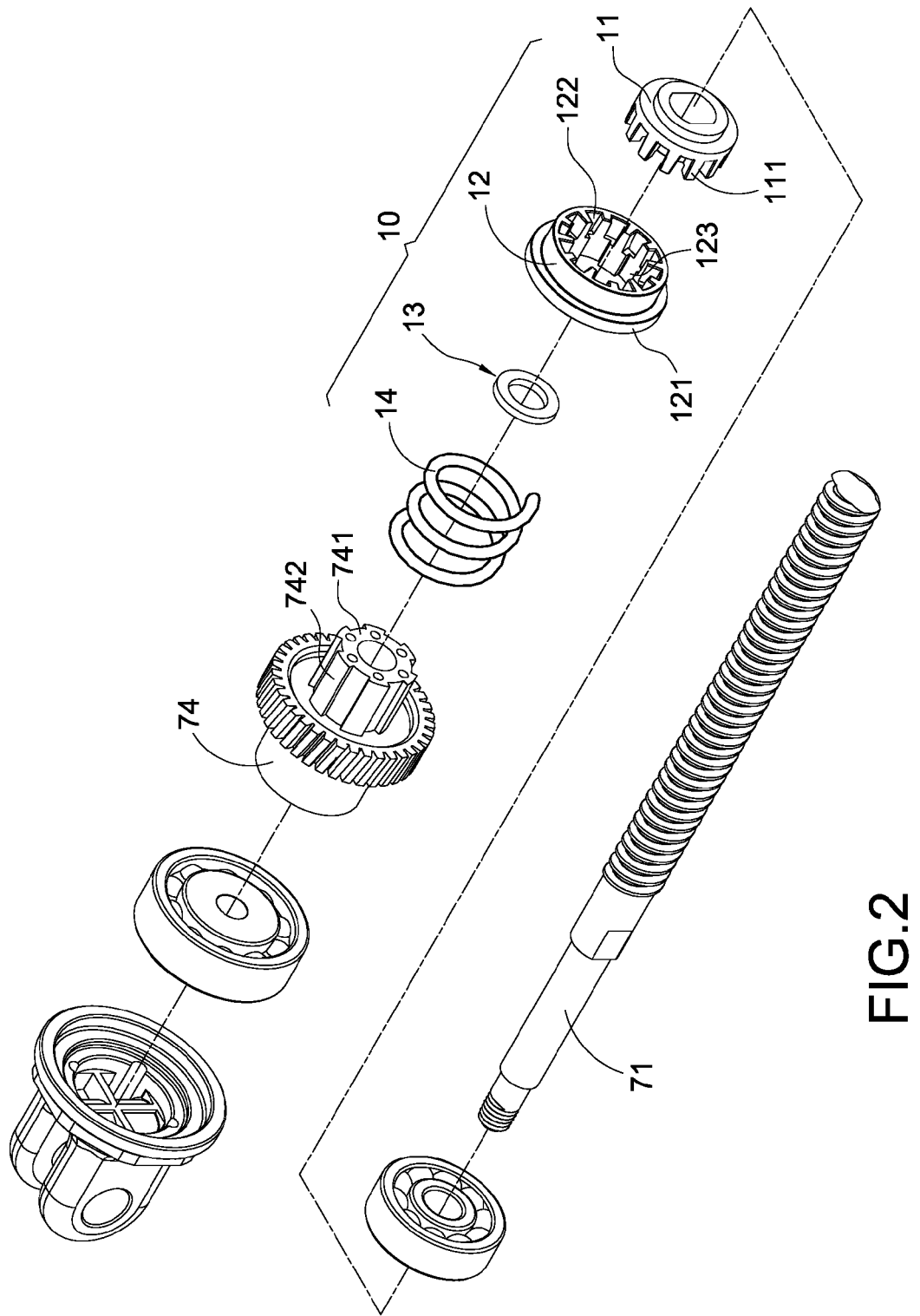
FIG. 2 is an exploded perspective view of the clutching means and the transmission means of the present invention.
Figure 3:
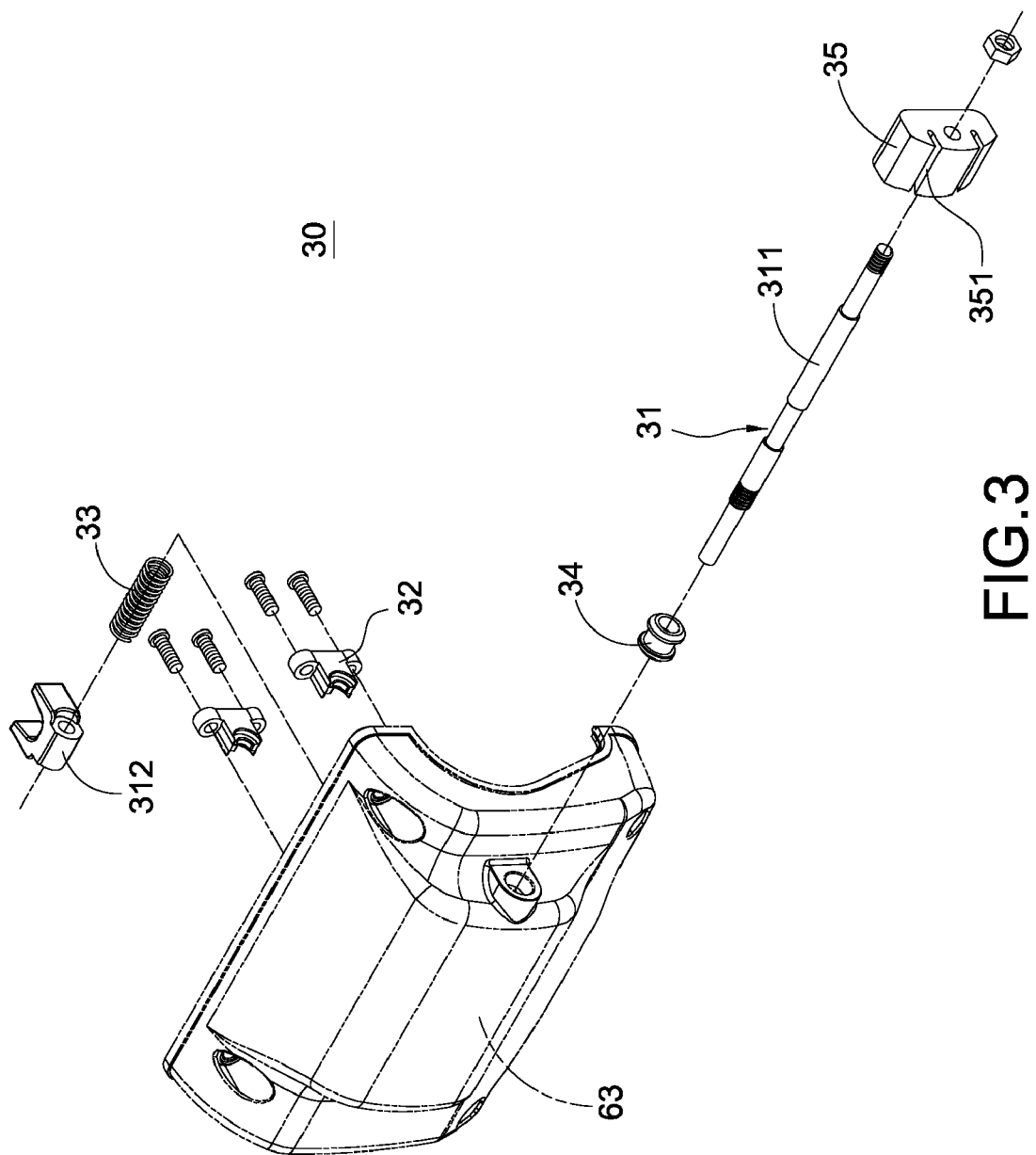
FIG. 3 is an exploded perspective view of the pulling means and the casing of the present invention.
Figure 4:
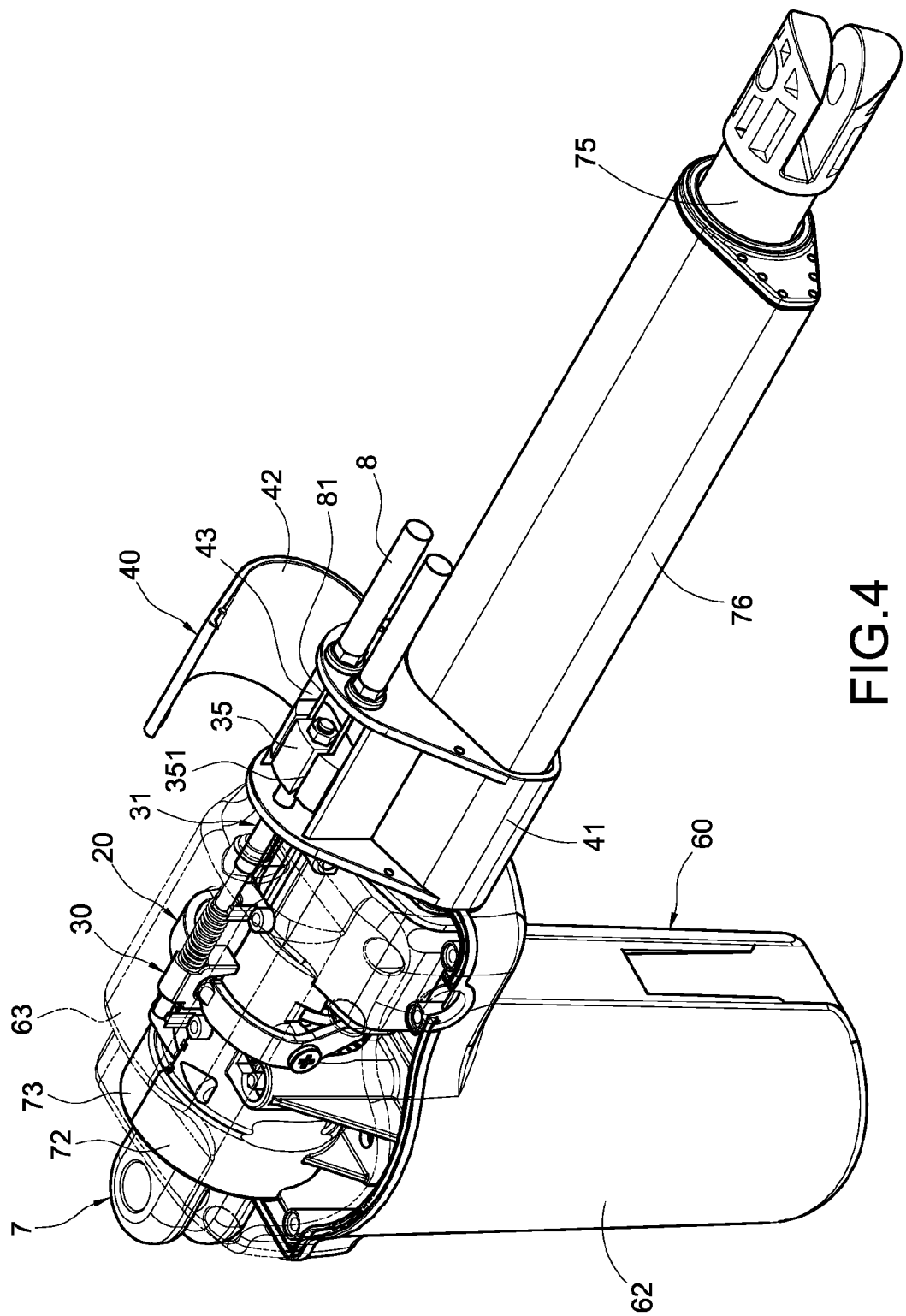
FIG. 4 is a schematic view showing the assembly of the actuator of the present invention.

FIG. 1 is an exploded perspective view of the actuator of the present invention. FIG. 2 is an exploded perspective view of the clutching means and the transmission means of the present invention. FIG. 3 is an exploded perspective view of the pulling means and the casing of the present invention. FIG. 4 is a schematic view showing the assembly of the actuator of the present invention. The present invention provides a fast-releasing controlling device of an actuator. The actuator has a motor means 6 and a transmission means 7. The motor means 6 comprises a motor 61, a lower casing 62 covering the outside of the motor 61, and an upper casing 63 correspondingly covering over the lower casing 62. A worm 611 projects from the center of the motor 61. The transmission means 7 comprises a screw rod 71, left and right bases 72, 73 (alternatively, the base can be integrally formed) covering one end of the screw rod 71, a worm gear 74 connected to the screw rod 71 and engaged with the worm 611, a telescopic tube 75 threadedly connected to the screw rod 71 and movable with respect to the screw rod 71, and an outer tube 76 fixedly connected to one side of the left and right bases 72, 73 and covering the outside of the telescopic tube 75. Both sides of the worm gear 74 are formed with a positioning sleeve 741 and insertion stripes 742, as shown in FIG. 2. The fast-releasing controlling device comprises a clutching means 10, a turning means 20 and a pulling means 30.

The clutching means 10 (as shown in FIG. 2) is connected to the rear of the screw rod 71 and accommodated within the left and right bases 72, 73. The clutching means 10 comprises a fixing base 11, a clutch 12, a washer 13 and a compression spring 14. The fixing base 11 is fixed to the screw rod 71 via the central hole thereof and rotates therewith. The fixing base 11 is formed at the rear side thereof with a plurality of positioning blocks 111 that are arranged at intervals in an annular manner. The clutch 12 is formed into a cylindrical shape. A circular flange 121 extends outwardly from the bottom of the clutch 12. The front portion within the clutch 12 is formed with positioning grooves 122 for cooperating with the positioning blocks 111. The inner wall of the central hole of the clutch 12 is formed with troughs 123 that are arranged at intervals. The troughs 123 allow the insertion and connection of the insertion stripes 742 of the worm gear 74. The washer 13 is clamped between the corresponding end faces of the clutch 12 and the positioning sleeve 741 of the worm gear 74. The compression spring 14 is disposed at the outer periphery of the positioning sleeve 741, and clamped between the corresponding end faces of the clutch 12 and the worm gear 74.

The turning means 20 (as shown in FIG. 1) is accommodated within the upper and lower casings 63, 62, and comprises a "U"-shaped swinging arm 21 pivoted to the left and right bases 72, 73. The middle of the sealed end of the swinging arm 21 is formed with a pillar 211. Two circular poking rods 212 project from the inside of the open end, respectively. Each poking rod 212 penetrates into each base 72, 73, and is adhered onto the flange 121 (FIG. 5) of the clutch 12, thereby to control clutching action of the clutch 12 relative to the fixing base 11.

The pulling means 30 (as shown in FIG. 3) comprises a pulling rod assembly 31, two clamping plates 32, an elastic body 33, a waterproof gasket 34 and a connecting block 35. The pulling rod assembly 31 comprises a pulling rod 311 and a "U"-shaped fastener 312 screwed to the rear of the middle section of the pulling rod 311. The opening of the fastener 312 is fastened to the pillar 211 (FIG. 4) of the swinging arm 21. One end of the pulling rod 311 and the fastener 312 are accommodated within the upper casing 63, and are fixedly connected to the upper casing 63 via the clamping plate 32 together with screws. The elastic body 33 may be a compression helical spring, which covers on the pulling rod 311 and is clamped between the corresponding end faces of the fastener 312 and the clamping plate 32. The waterproof gasket 34 covers on the pulling rod 311 and is fixed on the upper casing 63, thereby to prevent the external moisture from penetrating into the upper and lower casings 62, 63 and thus achieve a good waterproof effect. The connecting block 35 is fixedly connected to the outside end of the pulling rod 311 and formed on the outside of the upper and lower casings 62, 63. Two elongated grooves 351 are provided on the connecting block 35.

Further, the present invention includes an auxiliary holding means 40 covering on the outer tube 76 to abut against the end faces of the upper and lower casings 63, 62. The auxiliary holding means 40 comprises an annular base 41 and a covering plate 42 pivoted to one side of the annular base 41. An accommodating chamber 43 is formed between the annular base 41 and the covering plate 42 for accommodating one end of the pulling rod assembly 31 and the connecting block 35.

After the above structure is completely assembled, one end of each of two cable sets 8 penetrates through and is fixed to one side of the annular base 41, respectively. The other end of the cable 81 of each cable set 8 is inserted into the elongated groove 351 of the connecting block 35. Then, the covering plate 42 covers on the annular base 41. In this way, the assembly of an actuator structure can be completed, as shown in FIG. 4.

Figure 5:
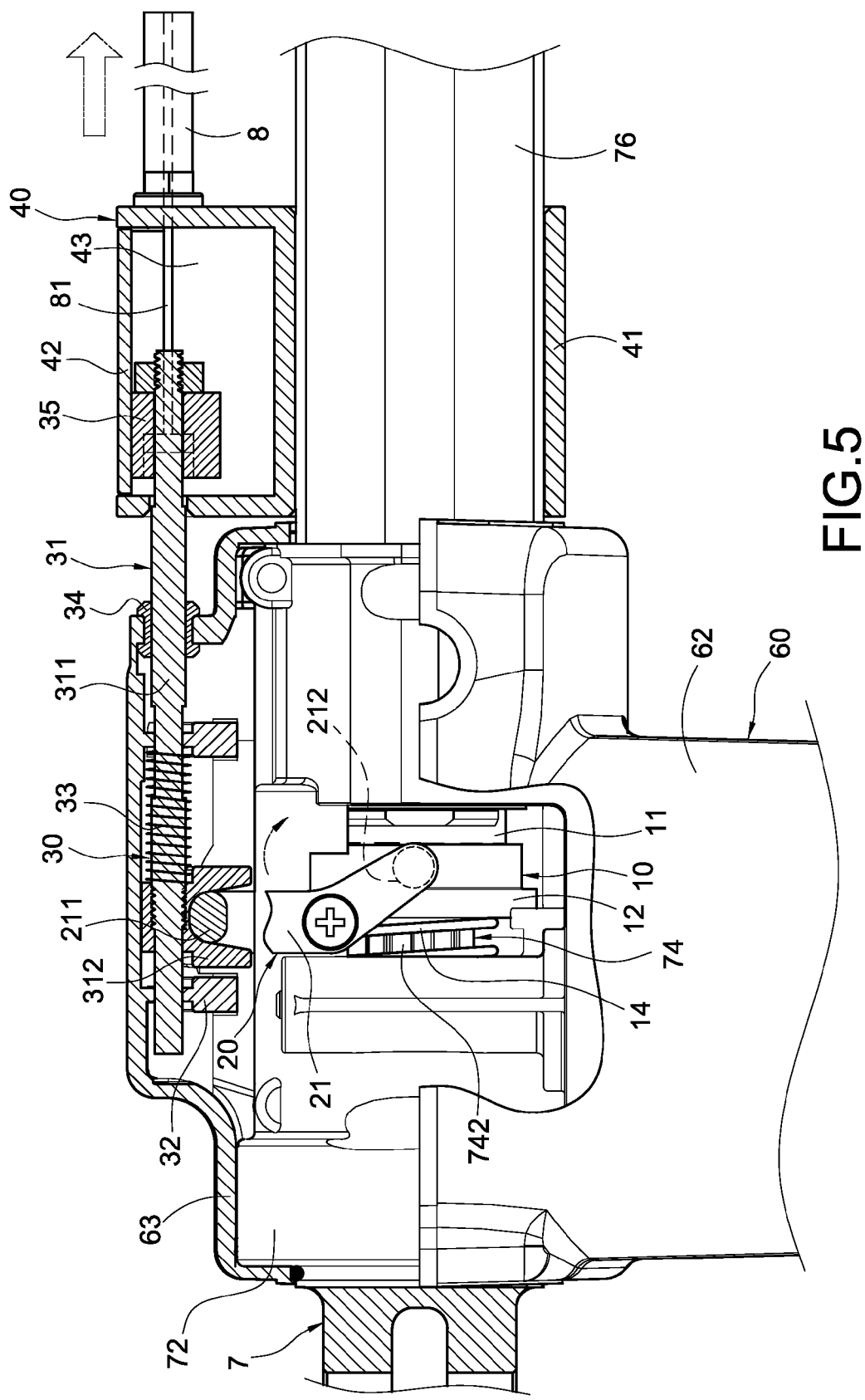
FIG. 5 is an assembled cross-sectional view showing the state prior to the operation of the pulling means of the present invention.
Figure 6:
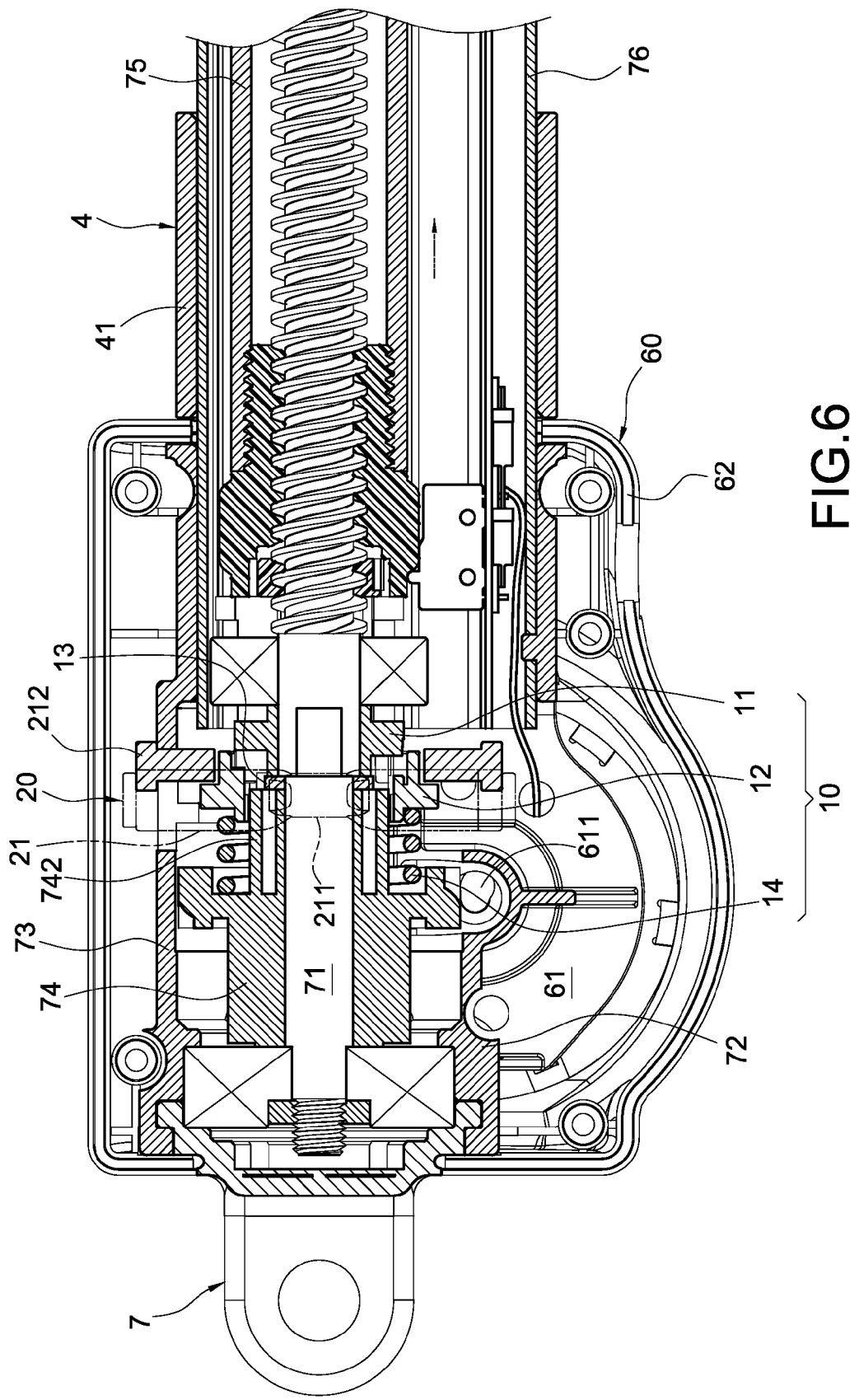
FIG. 6 is an assembled cross-sectional view showing the state prior to the operation of the clutching means of the present invention.
Figure 7:
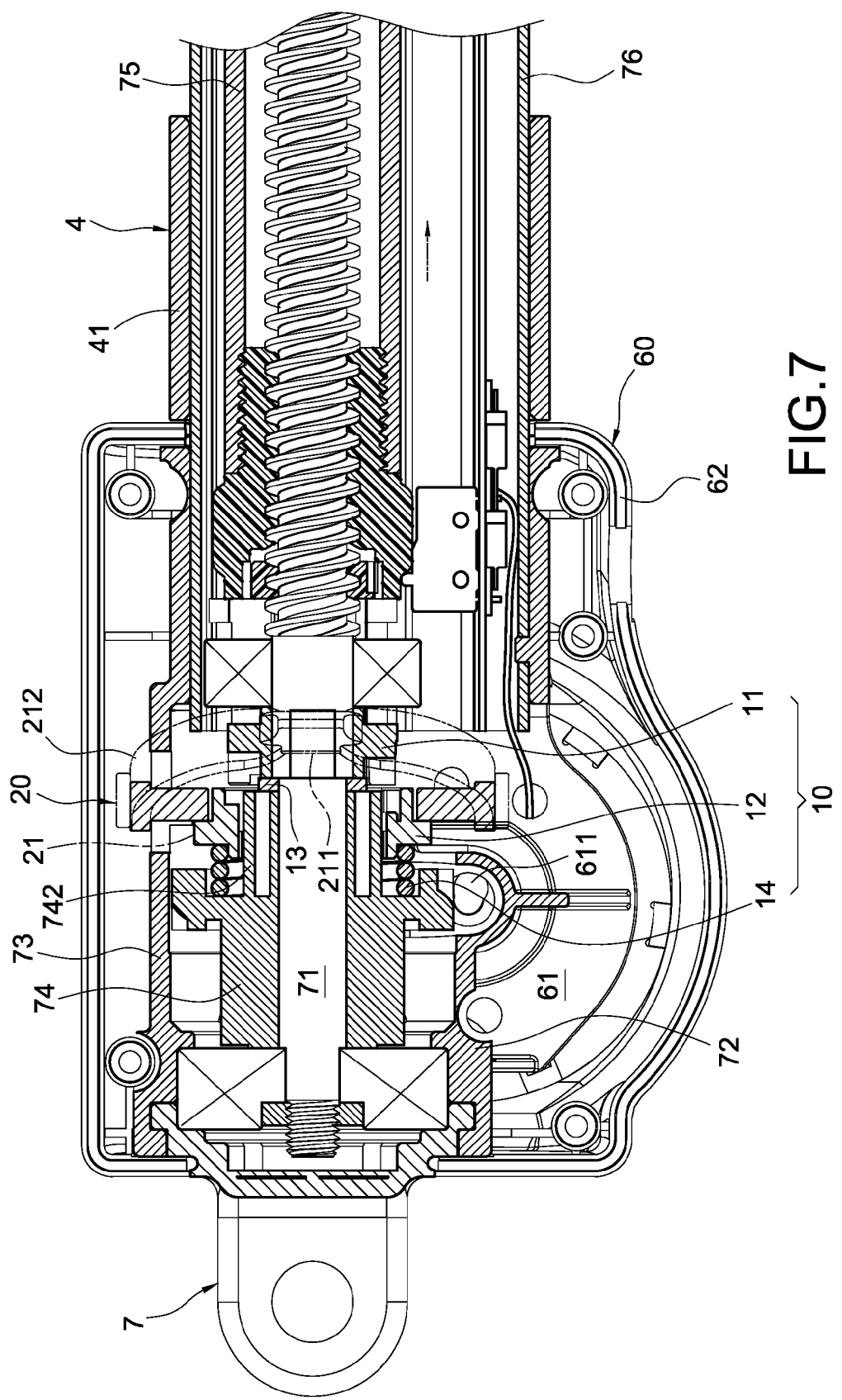
FIG. 7 is an assembled cross-sectional view showing the state after the operation of the clutching means of the present invention.

FIG. 5 is an assembled cross-sectional view showing the state prior to the operation of the pulling means of the present invention. FIG. 6 is an assembled cross-sectional view showing the state prior to the operation of the clutching means of the present invention. FIG. 7 is an assembled cross-sectional view showing the state after the operation of the clutching means of the present invention. The actuator of the present invention can be mounted on a sickbed (not shown). The rotation of the worm 611 of the motor 61 can cause the rotation of the worm gear 74 engaged in the transmission means 7 and in turn cause the rotation of the screw rod 71. In this way, the telescopic tube 75 threadedly connected on the screw rod can project outwardly or retract inwardly, thereby to control the lifting or lowering action of the front/rear section of the sickbed.

When a patient is subjected to an emergent medical treatment and the sickbed has to be flat, the operator can pull the cable 81 to move the connecting block 35, causing the pulling rod assembly 31 to linearly project, so that the swinging arm 21 swings around its pivot acting as the center of rotation. With the poking rod 212, the flange 121 of the clutch 12 can be poked to separate from the fixing base 11. At this time, there is no engagement between the screw rod 71 and the worm gear 74, and thus both of them can rotate freely. Therefore, when an axial pushing force is applied to the telescopic tube 75 (or with the weight of the sickbed itself), the screw rod 71 can rotate with respect to the telescopic tube 75, so that the telescopic tube 75 can rapidly retract into the outer tube 76, thereby to fast release the sickbed.

According to the above, the present invention indeed achieves the desired effects by employing the above-mentioned structure. Further, the present invention has not been published or put to public use prior to applying for a patent, and thus really has novelty and inventive steps to conform to the requirements for a utility model patent.

Although the present invention has been described with reference to the foregoing preferred embodiment, it will be understood that the invention is not limited to the details thereof. Various equivalent variations and modifications can still be occurred to those skilled in this art in view of the teachings of the present invention. Thus, all such variations and equivalent modifications are also embraced within the scope of the invention as defined in the appended claims.

What is claimed is:

1. A fast-releasing controlling device of an actuator, the actuator having a motor means (6) and a transmission means (7), the motor means (6) comprising a casing (63), the transmission means (7) comprising a screw rod (71) and a base (72, 73) covering on one end of the screw rod (71), the fast-releasing controlling device comprising:

a clutching means (10) accommodated within the base (72, 73), the clutching means (10) comprising a fixing base (11) connected to the screw rod (71) and a clutch (12) arranged to correspond to the fixing base (11);

a turning means (20) accommodated within the casing (63), the turning means (20) comprising a swinging arm (21) pivoted to the base (72, 73), one end of the swinging arm (21) arranged to correspond to the clutch (12) so as to control the clutching action of the clutch (12) relative to the fixing base (11); and a pulling means (30) comprising a pulling rod assembly (31), one end of the pulling rod assembly (31) accommodated within the casing (63) and connected onto the swinging arm (21), and the other end thereof penetrating out of the casing (63) and joined with a connecting block (35), while the pulling rod assembly (31) is moved by pulling the connecting block (35), the pulling rod assembly (31) causes the swinging arm (21) to swing, and the swinging arm (21) makes the clutch (12) disengaged from the fixing base (11).

2. The fast-releasing controlling device of an actuator according to claim 1, wherein the swinging arm (21) is formed into a "U"-lettered shape, the closed end thereof is formed with a pillar (211), two poking rods (212) project from the inside of the open end of the swinging arm, each poking rod (212) penetrates into each base (72, 73) and is adhered onto the clutch (12).

3. The fast-releasing controlling device of an actuator according to claim 2, wherein the pulling rod assembly (31) comprises a pulling rod (311) and a fastener (312) connected to the pulling rod (311), the fastener (312) is formed into a "U"-lettered shape, and the opening thereof is fastened to the pillar (211) of the swinging arm (21).

4. The fast-releasing controlling device of an actuator according to claim 3, wherein the pulling means (30) further comprises a clamping plate (32), the clamping plate (32) is disposed onto the pulling rod (311) for fixing the pulling rod (311) within the casing (63).

5. The fast-releasing controlling device of an actuator according to claim 4, wherein the pulling means (30) further comprises an elastic body (33), the elastic body (33) covers on the pulling rod (311) and is clamped between the fastener (312) and the clamping plate (32).

6. The fast-releasing controlling device of an actuator according to claim 5, wherein the elastic body (33) is a compression helical spring.

7. The fast-releasing controlling device of an actuator according to claim 3, wherein the pulling means (30) further comprises a waterproof gasket (34), the waterproof gasket (34) covers on the pulling rod (311) and is fixed to the upper casing (63).

8. The fast-releasing controlling device of an actuator according to claim 1, wherein two elongated grooves (351) are provided on the connecting block (35) of the pulling means (30).

9. The fast-releasing controlling device of an actuator according to claim 1, further comprising an auxiliary holding means (40) connected on the transmission means (7) and arranged to correspond to one side of the casing (63).

10. The fast-releasing controlling device of an actuator according to claim 9, wherein the holding means (40) comprises an annular base (41) and a covering plate (42) pivoted to one side of the annular base (41), an accommodating chamber (43) is formed between the annular base (41) and the covering plate (42) for accommodating one end of the pulling rod assembly (31) and the connecting block (35).

11. An actuator with a fast-releasing controlling device, the actuator having a motor means (6), a transmission means (7) and a fast-releasing controlling device, the motor means (6) comprising a casing (63), the transmission means (7) comprising a screw rod (71), a base (72, 73) covering on one end of the screw rod (71) and a telescopic tube (75) threadedly connected to the screw rod (71) and movable with respect to the screw rod (71), the fast-releasing controlling device comprising:

a clutching means (10) accommodated within the base (72, 73), the clutching means (10) comprising a fixing base (11) connected to the screw rod (71) and a clutch (12) arranged to correspond to the fixing base (11);

a turning means (20) accommodated within the casing (63), the turning means (20) comprising a swinging arm (21) pivoted to the base (72, 73), one end of the swinging arm (21) arranged to correspond to the clutch (12) so as to control clutching action of the clutch (12) relative to the fixing base (11); and a pulling means (30) comprising a pulling rod assembly (31), one end of the pulling rod assembly (31) accommodated within the casing (63) and connected to the swinging arm (21), and the other end of pulling rod assembly (31) penetrating out of the casing (63) and joined with a connecting block (35), while the pulling rod assembly (31) is moved by pulling the connecting block (35), the pulling rod assembly (31) causes the swinging arm (21) to swing, and the swinging arm (21) makes the clutch (12) disengaged from the fixing base (11), and as such, if a pushing force is applied to the telescopic tube (75) that has moved forward, the screw rod (71) would rotate with respect to the telescopic tube (75), so that the telescopic tube (75) is retracted.

12. The actuator with a fast-releasing controlling device according to claim 11, wherein the swinging arm (21) is formed into a "U"-lettered shape, the closed end thereof is formed with a pillar (211), two poking rods (212) project from the inside of the open end of the swinging arm, each poking rods (212) penetrates into each base (72, 73) and is adhered onto the clutch (12).

13. The actuator with a fast-releasing controlling device according to claim 12, wherein the pulling rod assembly (31) comprises a pulling rod (311) and a fastener (312) connected to the pulling rod (311), the fastener (312) is formed into a "U"-lettered shape, and the opening thereof is fastened to the pillar (211) of the swinging arm (21).

14. The actuator with a fast-releasing controlling device according to claim 13, wherein the pulling means (30) further comprises a clamping plate (32), the clamping plate (32) is disposed onto the pulling rod (311) for fixing the pulling rod (311) within the casing (63).

15. The actuator with a fast-releasing controlling device according to claim 14, wherein the pulling means (30) further comprises an elastic body (33), the elastic body (33) covers on the pulling rod (311) and is clamped between the fastener (312) and the clamping plate (32).

16. The actuator with a fast-releasing controlling device according to claim 13, wherein the pulling means (30) further comprises a waterproof gasket (34), the waterproof gasket (34) covers on the pulling rod (311) and is fixed to the upper casing (63).

* * * * *